US008400433B2

(12) United States Patent
Griffin et al.

(10) Patent No.: US 8,400,433 B2
(45) Date of Patent: Mar. 19, 2013

(54) HANDHELD ELECTRONIC DEVICE HAVING FACILITATED TELEPHONE DIALING WITH AUDIBLE SOUND TAGS, AND ASSOCIATED METHOD

(75) Inventors: Jason T. Griffin, Waterloo (CA); Mihal Lazaridis, Waterloo (CA); Julian Paas, Mississauga (CA); Jay D. Steele, Fall River (CA); Craig E. Ranta, Waterloo (CA)

(73) Assignee: Research In Motion Limited, Waterloo (CA)

( * ) Notice: Subject to any disclaimer, the term of this patent is extended or adjusted under 35 U.S.C. 154(b) by 2197 days.

(21) Appl. No.: 10/894,540

(22) Filed: Jul. 20, 2004

(65) Prior Publication Data

US 2006/0019707 A1 Jan. 26, 2006

(51) Int. Cl.
*G06F 3/033* (2006.01)
(52) U.S. Cl. ........................................................ 345/184
(58) Field of Classification Search .................. 345/156, 345/168, 169, 184; 701/1, 36, 49, 131
See application file for complete search history.

(56) References Cited

U.S. PATENT DOCUMENTS

| 5,950,123 | A | 9/1999 | Guimont et al. |
| 6,346,894 | B1 | 2/2002 | Connolly et al. |
| 6,477,390 | B1 | 11/2002 | Gum et al. |
| 6,489,950 | B1 | 12/2002 | Brown et al. |
| 6,571,154 | B2 * | 5/2003 | Worrell et al. .................... 701/1 |
| 6,687,604 | B2 * | 2/2004 | Kato ............................. 701/200 |
| 6,697,827 | B1 * | 2/2004 | D'Agosto, III ............... 708/131 |

FOREIGN PATENT DOCUMENTS

| GB | 2292499 A | 2/1996 |
| GB | 2332172 A | 6/1999 |
| GB | 2357402 A | 6/2001 |
| WO | WO 95/23476 A | 8/1995 |

* cited by examiner

*Primary Examiner* — Kevin M Nguyen

(57) ABSTRACT

An improved hand held electronic device and an associated method provide facilitated telephone dialing by providing audible sound tags in the form of spoken words representative of numbers that can be selected by a user for dialing. The handheld electronic device includes an input apparatus that can generate a plurality of navigational inputs and at least a first selecting input. The input apparatus may include a rotatable dial, the rotation of which provides navigational inputs, and the dial may be translatable, with the translation generating a selecting input. When a processor of the handheld electronic device detects one of the navigational inputs, the handheld electronic device outputs an audible sound in the form of a spoken word of the digit that corresponds with that navigational input.

6 Claims, 4 Drawing Sheets

HANDHELD ELECTRONIC DEVICE HAVING FACILITATED TELEPHONE DIALING WITH AUDIBLE SOUND TAGS, AND ASSOCIATED METHOD

BACKGROUND OF THE INVENTION

1. Field of the Invention

The invention relates generally to handheld electronic devices and, more particularly, to a handheld electronic device having facilitated telephone dialing. The invention also relates to a method of facilitating telephone dialing on a handheld electronic device.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Many handheld electronic devices also feature wireless communication capability although many such handheld electronic devices are stand-alone devices that are functional without communication with other devices.

Cellular telephones and other devices that provide cellular telephone capabilities often are used in automobiles, frequently while the telephone user is driving the automobile. A user typically must take his eyes from the road to perform a telephone dialing operation, which is undesirable, even if it happens only momentarily. Cellular telephones are also used when walking and doing other activities, and a user typically must look at the telephone to perform a telephone dialing operation, which is likewise undesirable. While cellular telephones oftentimes can store telephone numbers for later recall, such recalling of stored telephone numbers still requires the visual attention of a user. Even if a user can dial a conventional telephone keyboard without looking, certain telephone devices can include an unconventional keyboard that might require the visual attention of a user, which can likewise be undesirable.

SUMMARY OF THE INVENTION

An improved handheld electronic device and an associated method provide facilitated telephone dialing by providing audible sound tags in the form of spoken words representative of numbers that can be selected by a user for dialing. The handheld electronic device includes an input apparatus that can generate a plurality of navigational inputs and at least a first selecting input. The input apparatus may include a rotatable dial, the rotation of which provides navigational inputs, and the dial may be translatable, with said translation generating a selecting input. When a processor of the handheld electronic device detects a navigational input, the handheld electronic device outputs an audible sound in the form of a spoken word of the digit that corresponds with the navigational input.

Accordingly, an aspect of the invention is to provide an improved handheld electronic device and a method that facilitate telephone dialing.

Another aspect of the invention is to provide an improved handheld electronic device and method in which audible sound tags representative of spoken digits are provided to a user to indicate digits that can be selected for dialing as part of a telephone number.

Another aspect of the invention is to provide an improved handheld electronic device and method in which a user can operate a telephone dialing function by rotating a rotatable dial, hearing audible sound tags representative of spoken words corresponding with digits, and selecting digits based upon the sound tags to assemble a telephone number which can then be dialed.

These and other aspects of the invention are provided by an improved method of enabling input into a handheld electronic device, the handheld electronic device including an input apparatus having at least one input member that is movable in a first direction and in a second direction to generate a plurality of navigational inputs, the input apparatus being adapted to generate at least one selecting input to said handheld electronic device, in which the general nature of the method can be stated as including detecting a first of said navigational inputs from said at least one input member, detecting which of movement of said at least one input member in said first direction and movement of said at least one input member in said second direction generated said first of said navigational inputs, and outputting a first audible sound tag representing a first spoken word that corresponds with said first of said navigational inputs.

The method may include detecting a first of the selecting inputs and processing a function that corresponds with the first of the navigational inputs. The improved method may include detecting a second of the navigational inputs, detecting a third of the navigational inputs within a predetermined period of time after detection of the second of the navigational inputs, and outputting a third audible sound tag representing a third spoken word that corresponds with the third of the navigational inputs. The method may include again outputting the first audible sound tag after the expiration of a predetermined period of time during which neither a second of the navigational inputs nor a selecting input is detected. The method may include incrementing a counter when the first of the navigational inputs results from movement of the at least one input member in the first direction, and decrementing the counter when the first of the navigational inputs results from movement of the at least one input member in the second direction.

Other aspects of the invention are provided by an improved handheld electronic device, the general nature of which can be stated as including a processor apparatus, an input apparatus, a memory, and an audible output transducer. The input apparatus cooperates with the processor apparatus and includes at least one input member that is movable in a first direction and in a second direction to generate a plurality of navigational inputs. Also, the input apparatus is adapted to generate at least one selecting input to the processor apparatus. The memory and the audible output transducer cooperate with the processor apparatus. The processor apparatus detects one of the navigational inputs from the at least one input member, detects which of movement of the at least one input member in the first direction and movement of the at least one input member in the second direction generated the one of the navigational inputs, and obtains from the memory a corresponding first signal. Responsive to the first signal, the audible output transducer outputs a sound corresponding with a spoken word.

The improved handheld electronic device may be configured such that the processor apparatus includes a processor and a digital-to-analog converter. In such a configuration, the digital-to-analog converter would cooperate with the processor, and the audible output transducer would cooperate with the digital-to-analog converter. In such a configuration, the first signal would be a first digital signal and, responsive to the first digital signal, the digital-to-analog converter would output to the audible output transducer a first analog signal representing the spoken work. The improved handheld electronic device may be configured such that the processor apparatus includes a counter, wherein the processor apparatus increments the counter when the first of the navigational inputs results from movement of the at least one input member in the first direction, and wherein the processor apparatus decrements the counter when the first of the navigational inputs results from movement of the at least one input member in the second direction.

BRIEF DESCRIPTION OF THE DRAWINGS

A full understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
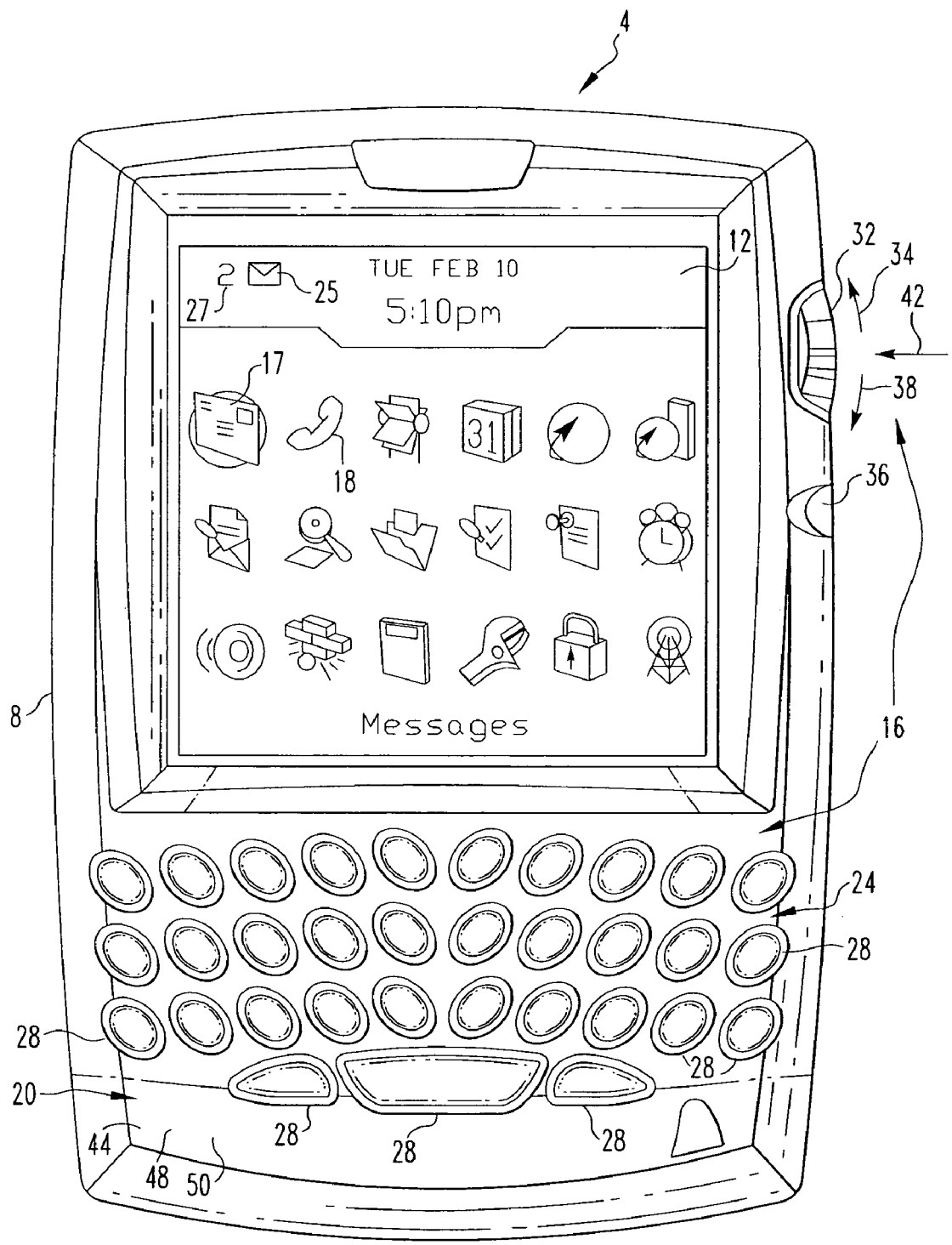
FIG. 1 is a top plan view of an improved handheld electronic device in accordance with the invention.
Figure 2:
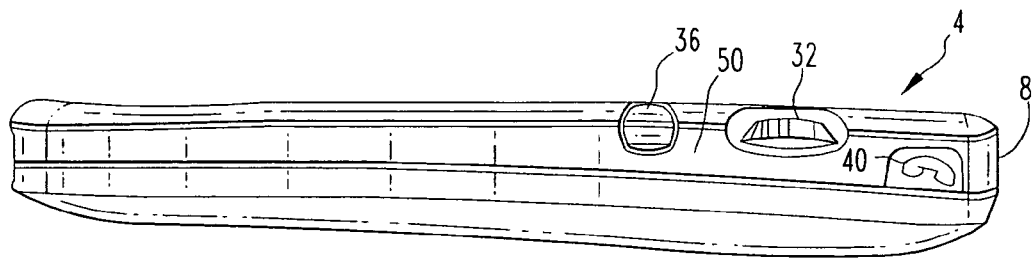
FIG. 2 is a side view of the handheld electronic device of FIG. 1.
Figure 3:
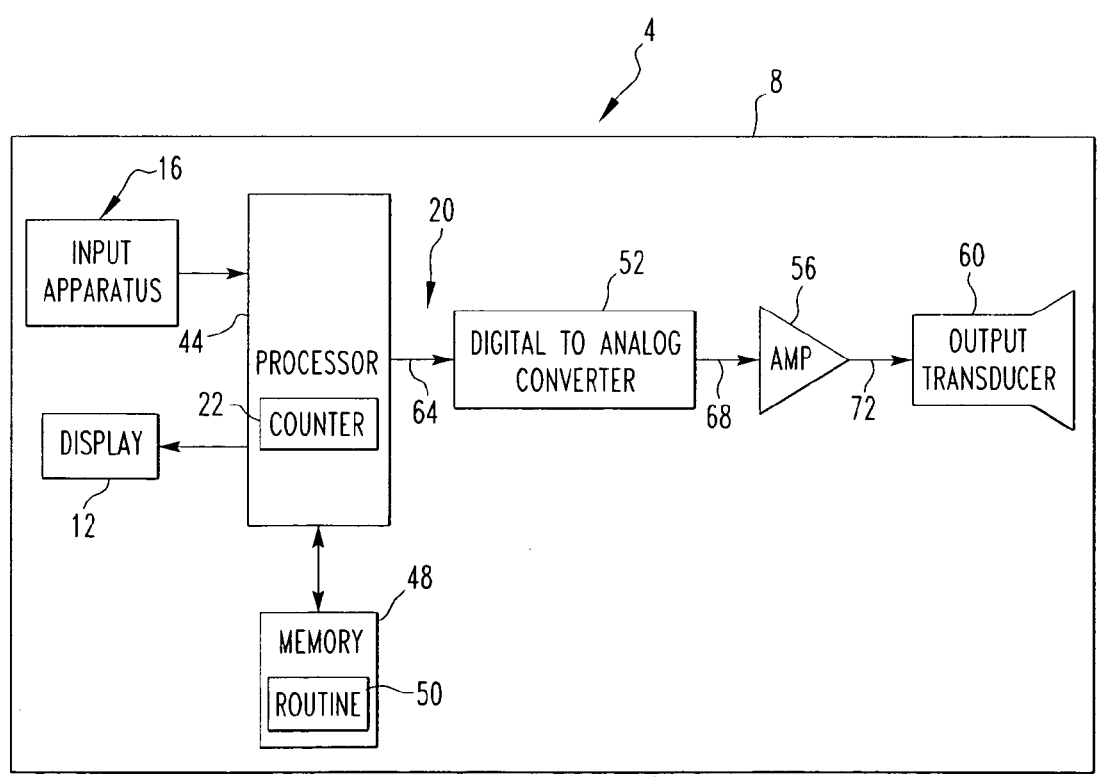
FIG. 3 is a block diagram of the handheld electronic device of FIG. 1.

An improved handheld electronic device 4 in accordance with the invention is indicated generally in FIGS. 1-3. Examples of handheld electronic devices are included in U.S. Pat. Nos. 6,452,588 and 6,489,950 which are incorporated by reference herein. The handheld electronic device 4 includes a housing 8, a display 12, an input apparatus 16, and a processor apparatus 20. The handheld electronic device 4 is of a type that includes a cellular telephone capability 18 which, as will be described in greater detail below, provides facilitated dialing in accordance with an improved method of the invention.

The exemplary input apparatus 16 includes a keyboard 24 having a plurality of keys 28, an input dial 32, an <ESCAPE> key 36, and a telephone key 40 (FIG. 2). The input dial 32 is rotatable to provide a plurality of navigational inputs to the processor apparatus 20. The input dial 32 also is translatable in the direction of the arrow 42 of FIG. 1 to provide a selecting input to the processor apparatus 20.

As can be seen in FIG. 3, the processor apparatus 20 includes a processor 44, a counter 22 (e.g., hardware, software, firmware, and the like), a memory 48, a digital-to-analog converter 52, an amplifier 56, and an audible output transducer 60. The processor 44 may be, for example and without limitation, a microprocessor (μP) or other type of processor. The memory 48 is cooperable with the processor 44 and may be any of a variety of internal an/or external storage media including RAM, ROM, EPROM, EEPROM, and/or the like. The processor apparatus 20 also includes a plurality of sound tags 50 and at least a first routine 54. The sound tags 50 are representative of spoken words of digits, symbols, and/or functions that can be provided in the context of a telephone dialing operation. The sound tags 50 may be stored in the memory 48 as .wav files or in other formats, and may be representative of spoken words in the English language or other languages. The routine 54 is executed by the processor 44 and may be in the form of software, firmware, and the like.

Responsive to a navigational input from the input apparatus 16, i.e., a rotation of the input dial 32, the processor 44 can access the memory 48 and retrieve one of the sound tags 50 that corresponds with the navigational input. More specifically, the input dial 32 is an input member that is rotatable in a first direction, as is indicated by the arrow 34 of FIG. 1, and is rotatable in a second direction, as is indicated by the arrow 38. The processor 44 detects whether the navigational input was generated by a rotation of the input dial 32 in the first direction 34 or in the second direction 38. If the rotation of the input dial 32 was in the first direction 34, then the processor 44 increments the counter 22. If the rotation of the input dial 32 was in the second direction 38, then the processor 44 decrements the counter 22. Responsive to the contents of the counter 22, the processor 44 accesses the memory 48 and retrieves the sound tags 50 that corresponds with the navigational input.

The processor 44 can then provide this retrieved sound tag 50 in the form of a sequence of digital values 64 (FIG. 3) to the digital-to-analog converter 52 which converts this sequence into a time-varying analog signal 68. The digital-to-analog converter 52 then provides the analog signal, which corresponds with a spoken word, to the amplifier 56. The amplifier 56 then provides an amplified analog signal 72 to the audible output transducer 60 which outputs an audible sound representative of the spoken word.

The amplifier 56 may have an adjustable gain (not expressly depicted) that is set by the processor 44. The audible output transducer 60 can be any of an internal speaker, a separate loudspeaker, a headset speaker, or any other such device. Depending upon the nature of the audio output transducer 60, the gain of the amplifier 56 preferably is accordingly adjusted by the processor 44.

Figure 4:
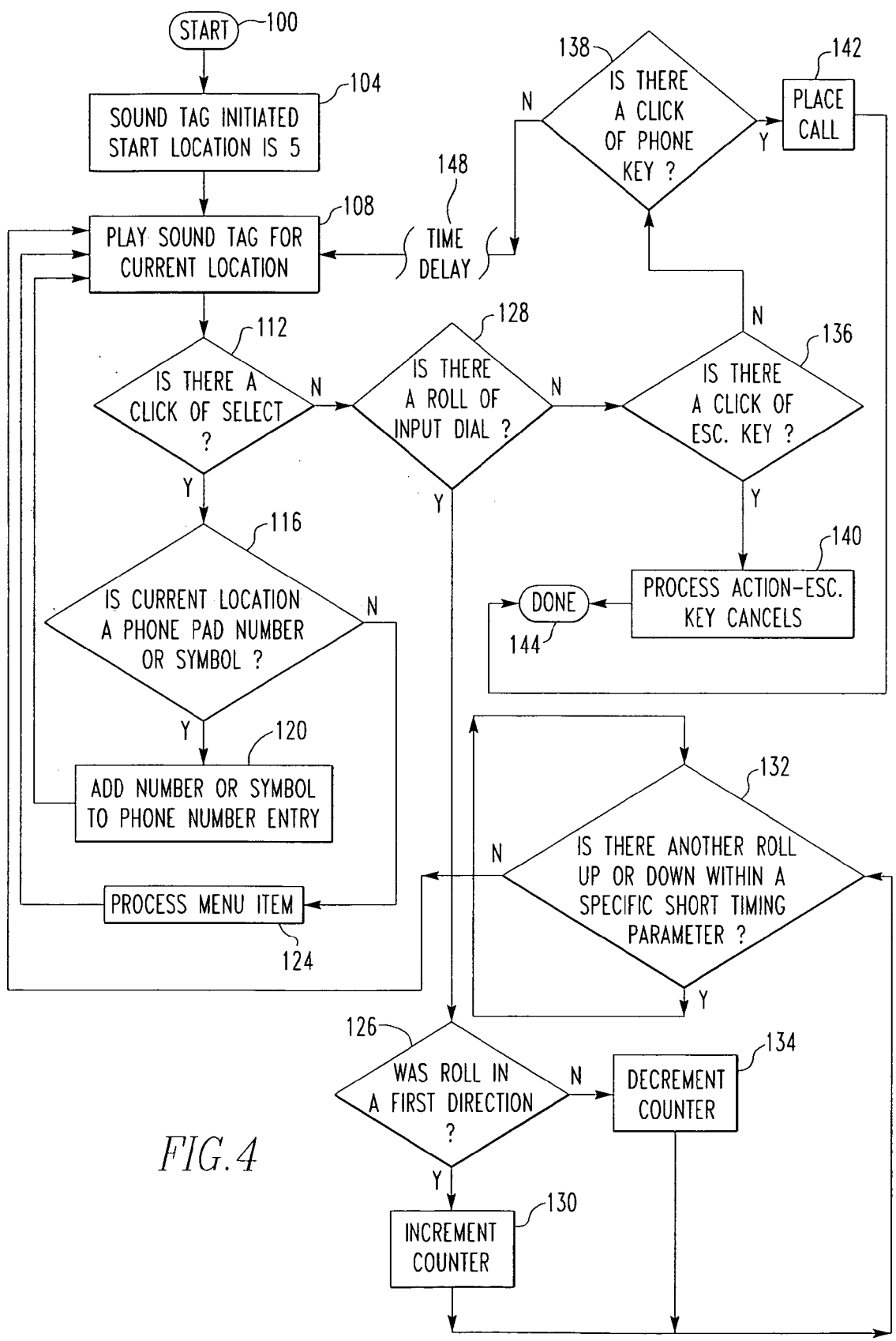
FIG. 4 is a flowchart depicting a portion of a routine executed by a processor of the handheld electronic device of FIG. 1.

An exemplary flow chart is depicted in FIG. 4 as representative of a portion of the routine 54 that is executed by the processor 44. The user initiates, at 100, a telephone function of the handheld electronic device 4, such as by switching on the handheld electronic device 4 or by pressing a given button or selecting an option from a menu, or the like.

The exemplary input apparatus 16 of FIG. 1 includes an exemplary input member in the form of an input dial 32 which, when rotated, provides the navigational inputs to the processor 44. More specifically, the exemplary input dial 32 includes a plurality of detents (not specifically depicted) that are circumferentially distributed such that the user receives a desirable tactile feedback in the form of a click as the input dial 32 is rotated through a certain angle. When the input dial 32 is rotated in a first direction, the input dial 32 provides with each click a navigational input to the processor 44, with sequential navigational inputs of this type being representative of progressively increasing digits. When the input dial 32 is rotated in a second, opposite direction, the input dial 32 provides with each click a navigational input to the processor 44, with sequential navigational inputs of this type being representative of progressively decreasing digits. It is understood that the input apparatus 16 could have input members other than the input dial 32, such as, without limitation, joysticks and the like.

In the exemplary embodiment, the initial contents of the counter 22 correspond with a quantity of five. The contents of the counter 22 correspond with the rotational position of the input wheel 32. As such, the initial position of the input dial 32, that is, the rotational position of the input dial 32 at the initiation of the telephone function, is considered by the processor apparatus 20 to correspond with the digit 5. The processor apparatus 20 thus initiates at 104 the sound tag "five" upon initiation of the telephone function. The sound tag of the spoken word "five" is then played, as at 108.

If, after playing a sound tag 50, the next input detected by the processor 44 is a selecting entry, such as at 112, then the processor 44 then determines as at 116 whether the current location of the input dial 32 corresponds with a predefined function or if it corresponds with one of a digit and a symbol. A digit would be, for instance, one of the digits 0-9, and a symbol would be, for instance, one of # and *. One of the predefined functions might be, for instance, a function that replays the telephone number as it is stored in the memory 48. Other functions can be envisioned. If the current location of the input dial 32 corresponds with one of a digit and a symbol, then the digit or symbol is added as at 120 to a telephone number entry within the memory 48. With the aforementioned storage of the digit or symbol in the memory 48, processing continues at 108 to play additional sound tags 50 to enable completion of a telephone number for dialing.

An exemplary chart of the counter 22 and the character or function with which it corresponds is presented in Table 1. The exemplary Table 1 includes the digits 0-9, the # and * symbols, and two predefined functions. The counter 22 could be configured such that, for instance, a decrement from a value of zero would result in a value of thirteen, and an increment to a value of thirteen would result in a value of zero.

TABLE 1

| Counter | Corresponds with |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | # |
| 11 | * |
| 12 | Function 1 |
| 13 | Function 2 |

If, as at 116, the current location of the input dial 32 refers neither to a digit nor to a symbol, meaning that the current location would correspond with a predefined function of the telephone dialing system, then the processor 44 would process as at 124 the menu item and processing would return to 108 or, depending upon the nature of the menu item, processing may continue elsewhere. The menu items represented at various locations of the input dial 32 could be pre-programmed or user-defined.

If, as at 112, the next input detected after the playing of a sound tag 50 is not a selecting input, then the processor 44 would then determine at 128 whether the input dial 32 had been rotated to provide a navigational input. If a navigational input is detected at 128, such as from a rotation of the input dial 32, then the processor 44 detects at 126 whether the rotation of the input dial 32 was in the first direction 34. If rotation of the input dial 32 was in the first direction 34, then the processor 44 increments at 130 the counter 22. If rotation of the input dial 32 was not in the first direction 34, meaning that rotation of the input dial 32 was in the second direction 38, then the processor 44 decrements at 134 the counter 22.

The processor 44 then detects at 132 whether another navigational input is detected within a specific short timing parameter such as, for example, 100 milliseconds. If no additional navigational input is detected during the timing parameter, then processing continues at 108 where the processor 44 initiates playing of the sound tag 50 that corresponds with the then current location of the input dial 32 (i.e., the value of the counter 22). On the other hand, if the processor detects at 132 an additional navigational input during the timing parameter, such as would occur if a user, for example, quickly rotated the input dial 32 three clicks in a certain direction, then the processor 44 would detect such additional navigational inputs and would not play a sound tags 50 until the input dial 32 had been stationary for the predetermined timing parameter. As a result, if the user rotates the input dial 32 several rotational clicks in a short period of time, the processor 44 advantageously does not play sound tags 50 for the intermediate clicks, only for the final location of the input dial 32. The timing parameter could be any suitable value and/or may be adjustable by the user.

If, instead of detecting at 128 an additional navigational input, the processor 44 detects at 136 an input of the <ESCAPE> key 36, then the processor 44 would process at 140 the <ESCAPE> function. Alternatively if, instead of detecting at 136 an input of the <ESCAPE> key 36, the processor 44 detects at 138 an input of the telephone key 40, the processor would execute at 142 the telephone function. The <ESCAPE> function, which is initiated by the <ESCAPE> key 36, provides a cancellation operation at 140, such as an operation that cancels or deletes the last selected digit or symbol, that cancels the entire entered telephone number, or that terminates the telephone operation. The telephone function provided by the telephone key 40 is an <ENTER> operation that places at 142 a telephone call by dialing the telephone number stored in the memory 48. Upon placement of the telephone call, the telephone dialing process is terminated as at 144.

If no additional input is detected at 136 by the processor 44, then after a predetermined time delay 148 the processor 44 again plays at 108 the same sound tag 50. For instance, if after playing the sound tag "five" a time delay of, for example, four seconds elapses without detection of any of a selecting input, a navigational input, an input by the <ESCAPE> key 36, and an input by the telephone key 40, then after four seconds the processor 44 would again play the sound tag 50 "five".

As an example, if the user desired to dial the telephone number 555-6844, the user would initiate the telephone dialing operation at 100, and the audible output transducer 60 would play the sound tag 50 "five". The user would translate the input dial 32 in the direction of the arrow 42 (FIG. 1) to provide a selecting input to select a first digit for the telephone number. Upon selecting of the first digit, processing would return to 108, and the audible output transducer 60 would again play the sound tag 50 of "five" because the input dial 32 would still be at the same location. The user would then again translate the input dial 32, would again hear the sound tag 50 "five", and would translate the input dial 32 a third time. Thus far, the prefix "555" would be stored in the memory 48.

The user would then rotate the input dial 32 a single click in the first direction 34, e.g. counter-clockwise. The processor 44 having detected at 128 another navigational input, and having detected at 132 an absence of a further navigational input within the timing parameter, would play the sound tag 50 "six". The user then would translate the input dial 32 to provide at 112 a selecting input, and the digit "6" would be added to the incomplete telephone number stored in the memory 48. The user would then rotate the input dial 32 two clicks in the first direction 34 so that the input dial 32 would correspond with the digit "8". If the user had rotated the input dial 32 quickly, i.e., so that the navigational input for "8" is detected at 132 within the short timing parameter after detection of the navigational input for "7", then the processor 44 would play the sound tag 50 "eight" without having played the intermediate sound tag 50 "seven". The user would then provide a selecting input by translating the input dial 32, and the digit "8" would be added to the incomplete telephone number stored in the memory 48.

The user would then rotate the input dial 32 four clicks in the second direction 38, e.g., clockwise, to arrive at a rotational position corresponding with the digit "4". The processor 44 would play the sound tag 50 corresponding with the spoken word "four", and the user would provide a selecting input by translating the input dial 32, and the digit "4" would be added to the incomplete telephone number stored in the memory 48. Without moving the input dial 32, the processor 44 would again play the sound tag 50 corresponding with the spoken word "four", and the user would provide the selecting input of translating the input dial 32 to add the digit "4" to the telephone number stored in the memory 48. The user would then press the telephone key 40 to process, i.e., dial, the telephone number "555-6844" that is stored in the memory 48. The telephone dialing operation would then cease at 144 and the telephone call itself would proceed.

It is understood that the telephone call could be initiated in ways other than or in addition to pressing the telephone key 40. For instance, a user could quickly translate the thumbwheel 32 twice in the direction of the arrow 42 (FIG. 1), such as with a "double click". Similarly, the handheld electronic device 4 might be configured, if desired, to automatically dial the telephone number if it recognizes that a complete telephone number has been entered by a user. Other ways of initiating the dialing operation are possible.

It is understood that any type of telephone number could be dialed with the aforementioned improved routine 54 and method. For instance, the user could additionally provide area codes, country codes, and any other numbers and/or symbols that might be needed in dialing a desired telephone number. Also, if any time during the dialing process the user rotates the input dial 32 to correspond with a predefined function and provides a selecting input for the predefined function, the predefined function will be selected and executed.

Figure 5:
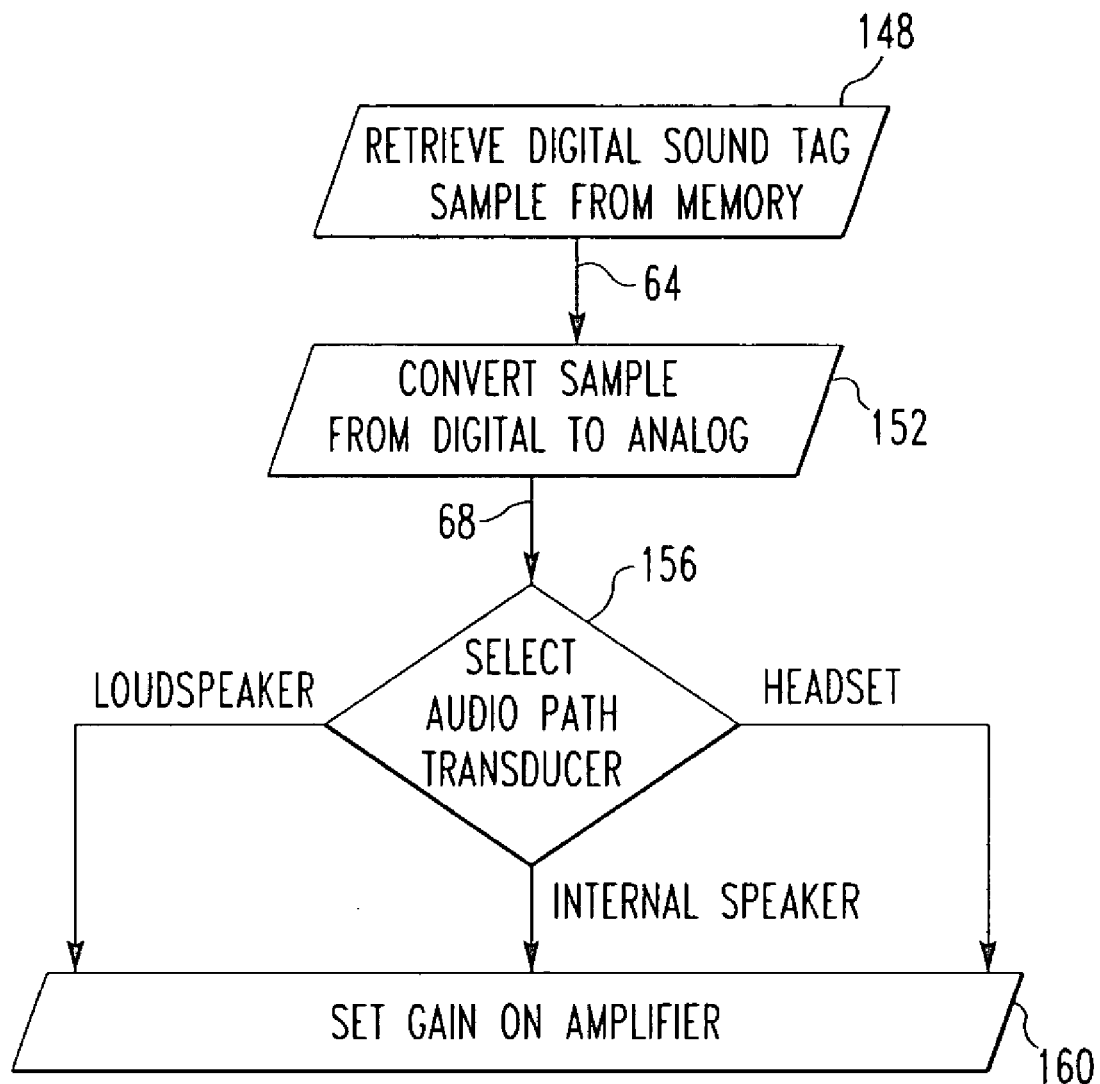
FIG. 5 is another flowchart depicting another portion of the routine executed by the processor of the handheld electronic device of FIG. 1.

An exemplary flowchart of the portion of the routine 54 that corresponds with the playing of the sound tags 50 is provided in FIG. 5. For instance, upon detecting the present location of the input dial 32, the processor 44 might initiate retrieval at 148 from the memory 48 a digital sound tag 50 representative of the current location of the input dial 32. The digital sound tag 50 would then be transferred at 152 in the form of a sequence of digital values 64 to the digital-to-analog converter 52. The digital-to-analog converter 52 would then convert the received sequence into a time-varying analog output 68. The processor 44 would determine at 156 the particular audio path to provide the time-varying analog output 68 to the output transducer, and this will determine, at least in part, the gain setting for the amplifier 56. The processor 44 then sets at 160 the gain on the amplifier 56, and the time-varying analog output 68 is delivered from the digital-to-analog converter 52 to the amplifier 56. It is understood that the amplified analog signal representative of a sound would then be transmitted to the audible output transducer 60, and the audible output transducer 60 would then produce an audible sound corresponding with a spoken word representative of the current rotational position of the input dial 32.

As indicated above, if the input apparatus 16 includes a different input member, such as a joystick, the telephone dialing method would function much the same as is depicted by the flow chart of FIGS. 4 and 5, except that instead of rolling, the joystick might pivot to provide navigational and/or selecting inputs. Such a joystick configuration may operate in a nonlinear mode, such as by allowing a user to move from the digit "5" to the digit "2" with a single upward motion. Such a joystick might comply with the mapping described in the standard ITU E.161, or may be of another configuration. It is also understood that the method herein could be applied to other applications, such as different telephone applications and non-telephone applications.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of enabling input into a handheld electronic device, the handheld electronic device including an input apparatus having at least one input member that is movable in a first direction and in a second direction to generate a plurality of navigational inputs, the input apparatus being adapted to generate at least one selecting input to said handheld electronic device, said method comprising:
   detecting a plurality of said navigational inputs from said at least one input member;
   detecting which of movement of said at least one input member in said first direction and movement of said at least one input member in said second direction generated each of said navigational inputs;
   outputting for each of at least some of the navigational inputs an audible sound tag representing a spoken word that corresponds with the navigational input;
   with respect to each of a plurality of the navigational inputs for which an audible sound tag was output:
   detecting a selecting input,
   storing a value represented by the audible sound tag; responsive to a predetermined input, processing the stored values; and
   further comprising again outputting an audible sound tag after expiration of a predetermined period of time during which neither a navigational input nor a selecting input is detected.

2. The method of claim 1 further comprising employing as said performing an enter operation dialing a telephone number that corresponds with said stored values.

3. The method of claim 1 further comprising incrementing a counter when one of said navigational inputs results from movement of said at least one input member in said first direction, and decrementing said counter when one of said navigational inputs results from movement of said at least one input member in said second direction.

4. A method of enabling input into a handheld electronic device, the handheld electronic device including an input apparatus having at least one input member that is movable to generate a plurality of navigational inputs, said method comprising: detecting a plurality of said navigational inputs from said at least one input member, the plurality of navigational inputs comprising a number of intermediate navigational inputs and a final navigational input; detecting the final navigational input within a predetermined period of time after detection of at least one of the number of intermediate navigational inputs, and outputting an audible sound tag representing a spoken word that corresponds with said final navigational input without outputting an audible sound tag corresponding with the at least one of the number of intermediate navigational inputs.

5. A handheld electronic device comprising:
   a processor apparatus;
   an input apparatus cooperating with said processor apparatus, said input apparatus including at least one input member that is movable in a first direction and in a second direction to generate a plurality of navigational inputs, the input apparatus being adapted to generate at least one selecting input to said processor apparatus;
   a memory cooperating with said processor apparatus; and
   an audible output transducer cooperating with said processor apparatus,
   wherein said processor apparatus detects a plurality of said navigational inputs from said at least one input member, detects which of movement of said at least one input member in said first direction and movement of said at least one input member in said second direction generated each of said navigational inputs, and for each of at least some of the navigational inputs obtains from said memory a corresponding signal,
   wherein said audible output transducer responsive to each of at least some of the signals outputs a sound corresponding with a spoken word; wherein with respect to each of a plurality of the navigational inputs for which a sound corresponding with a spoken word was output the processor apparatus:
   detects a selecting input, and stores a value represented by the spoken word; wherein responsive to a predetermined input, the processor apparatus processes the stored values;
   wherein said processor apparatus includes a counter, wherein said processor apparatus increments said counter when one of said navigational inputs results from movement of said at least one input member in said first direction, and wherein said processor apparatus decrements said counter when one of said navigational inputs results from movement of said at least one input member in said second direction.

6. The handheld electronic device of claim 5 wherein said enter operation includes dialing a telephone number that corresponds with the stored values.

\* \* \* \* \*